June 22, 1926.
O. SODERHOLM
RIDING STICK
Filed May 26, 1925
1,589,491
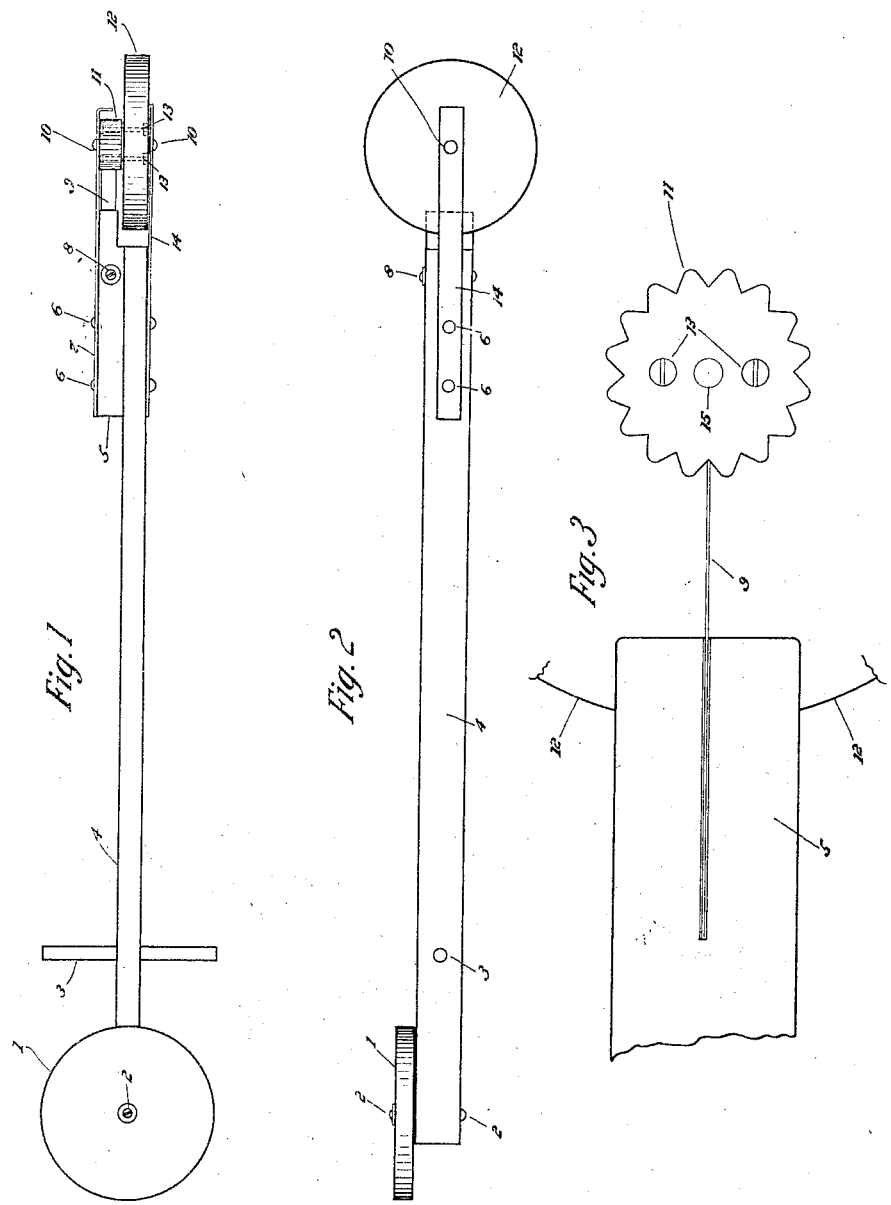
INVENTOR.
Oscar Soderholm Patented June 22, 1926.

1,589,491

UNITED STATES PATENT OFFICE.

OSCAR SODERHOLM, OF WAHOO, NEBRASKA.

RIDING STICK.

Application filed May 26, 1925. Serial No. 33,040.

This invention relates to what may be denominated a riding stick and the object of the invention is to provide a riding stick that will amuse the user more than the riding sticks heretofore in use, while at the same time there is nothing easily broken and nothing but what can be cheaply made.

One feature of the invention is to provide a riding stick having on it a wheel in imitation of an automobile steering wheel to amuse the stick user by causing him to imitate the steering of an automobile, although the imitation steering wheel has no steering functions.

An additional feature of the invention is to provide apparatus for automatically making a noise as the riding stick is pulled along in the usual way.

With these and other objects in view which will be apparent in light of the subsequent description taken in connection with the drawings, I will proceed to describe my invention in connection with the attached drawings in which:

Figure 1 is a plan view of the riding stick.

Fig. 2 is a side view thereof, and,

Fig. 3 is an enlarged view of the noise making tongue and cooperating wheel.

4 represents the riding stick which may be of the desired proportions both as to size and length. Near the forward end I provide the usual handle 3 projecting on either side of the stick 4 and, therefore, adapted to be grasped in either the right or left hand of the stick user. In front of the cross bar 3, I provide a wheel 1 in imitation of an automobile steering wheel, this wheel being pivoted on a pivot 2 so that it may turn. The function of this wheel is only psychological in effect, that is to say, the user of the stick 4, while holding the cross bar 3 in one hand, will turn the wheel in imitation of an automobile driver and thus imagine that he is steering the stick as a driver steers an automobile, for example, if he is turning to the right, he will pull around the wheel 1 as an automobile driver would pull that wheel to steer to the right, usually holding the cross bar 3 in his left hand. If he wishes to turn to the left, he will hold the bar 3 with the right hand and turn the wheel 1 with the left hand as he makes his turn, astride the stick 4. Of course the wheel has no steering function on the stick 4, but will somewhat imitate the steering of an automobile and thus please the stick rider by causing him to imagine that he is steering the stick 4.

At the rear of the stick 4, I attach a support 5, usually of wood and to the support 5 I attach a metal bar 7 by bolts 6. Since this apparatus is liable to be roughly used, I find it convenient to pass a bolt 8 through the support 5 to prevent its splitting, since I use a tongue 9 in a slot of the support 5 and extend it to a toothed wheel 11. The teeth of this wheel 11 are so constructed that the wheel may run in either direction in contact with the tongue 9 which as it springs from one tooth to the other, will make a clattering noise.

I conveniently attach the toothed wheel 11 to a larger wheel 12 and pivot both wheels between the bars 14 and 7, one attached to the support 5 and the other to the side of the stick 4 and pivot both wheels 12 and 11 on a pivot 10 extending between the bars 7 and 14. I conveniently attach the toothed wheel 11 to the wheel 12 by bolts 13 so as to cause the wheels to turn together. As the wheel 12 runs over the ground, it will cause the wheel 11 to turn with it and the tongue 9 as it springs from one tooth to the other of the wheel 11, will produce the necessary noise to amuse the stick user and the wheel 12 will additionally support the rear end of the stick rider and render the stick easily pulled over a surface, either a floor or the ground.

The stick is used in the ordinary way of using riding sticks, that is to say, with the user astride the stick 4, he holds the handle 3 in one hand and when he goes to turn, he pulls the imitation steering wheel 1 either to the right or to the left in accordance with the turn he desires to make and thus imagines himself steering the stick. As the stick user proceeds the wheel 12 will be caused to turn as it rolls over the surface of a floor or the ground, and causes the wheel 11 to turn with it which cooperates with the tongue 9 to produce the desired noise.

What I claim as my invention is:

A riding stick having a cross-bar near one end, a rotatable imitation steering wheel in front of the cross-bar, a bar on one side of the rear end of the stick, a tongue support on the other side of the stick having a slit therein, a second bar on the side of the tongue support, bolts passing through the bars, stick and support, a ground wheel pivoted between said bars, a smaller wheel bolted to the side of the ground wheel and a tongue extending from the slit of the tongue support, the wheel teeth being so shaped as to operate the tongue when the wheel is turned in either direction.

In testimony whereof I affix my signature.

OSCAR SODERHOLM.